United States Patent [19]
DeMaria et al.

[11] 3,911,375
[45] Oct. 7, 1975

[54] OPTICALLY PUMPED LASER SYSTEMS

[75] Inventors: Anthony J. DeMaria, West Hartford; Michael E. Mack, Vernon, both of Conn.

[73] Assignee: United Technologies Corporation, Hartford, Conn.

[22] Filed: June 21, 1973

[21] Appl. No.: 372,370

Related U.S. Application Data

[63] Continuation-in-part of Ser. No. 278,134, Aug. 4, 1972, abandoned.

[52] U.S. Cl. ............... 331/94.5 P; 330/4.3; 313/231
[51] Int. Cl.² ......................................... H01S 3/091
[58] Field of Search .................... 331/94.5; 330/4.3; 313/231

[56] References Cited
UNITED STATES PATENTS

| | | |
|---|---|---|
| 3,293,564 | 11/1964 | Fan .................................. 331/94.5 |
| 3,405,314 | 10/1968 | Van Ornum et al. ........... 313/231 X |
| 3,541,470 | 11/1970 | Lankard et al. .................... 331/94.5 |
| 3,548,336 | 12/1970 | Anderson et al. ................. 331/94.5 |
| 3,675,156 | 7/1972 | Danielmeyer ...................... 331/94.5 |

*Primary Examiner*—Robert J. Webster
*Attorney, Agent, or Firm*—Anthony J. Criso

[57] ABSTRACT

Laser systems which are pumped by an electric discharge formed in a gas are disclosed. The discharge is in the form of a vortex stabilized electric arc which is triggered with an auxiliary energy source. At high enough repetition rates residual ionization between successive pulses contributes to the pulse stabilization. The arc and the gain medium are positioned inside an optical pumping cavity where light from the arc is coupled directly into the gain medium.

7 Claims, 6 Drawing Figures

FIG. 1

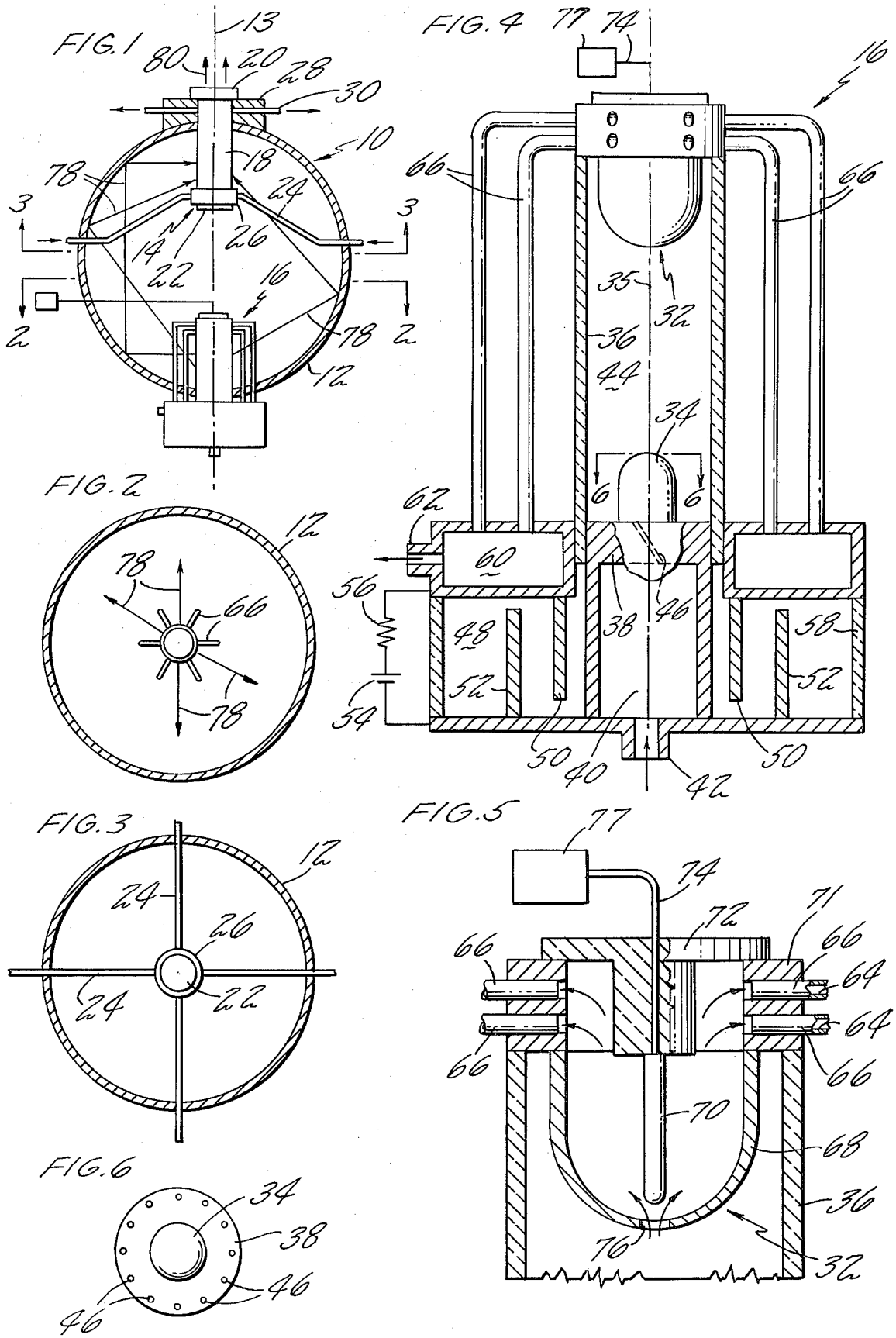

OPTICALLY PUMPED LASER SYSTEMS

The invention herein described was made in the course of or under a contract or subcontract thereunder with the Department of the Navy.

CROSS REFERENCE TO RELATED APPLICATION

This patent application is a continuation in part of application Ser. No. 278,134, now abandoned, which was filed on Aug. 4, 1972, and assigned to United Aircraft Corporation.

BACKGROUND OF THE INVENTION

1. Field of Invention

This invention relates to lasers and more particularly to optically pumped lasers which are capable of many high energy pulses at a high rate of repetition.

2. Description of the Prior Art

A typical pulsed laser application often includes the requirements that the output pulse have a high average power. Dye lasers that are capable of short duration high output pulses are readily available and systems capable of pulses with up to fifty milliwatts of average power output are commercially available. By pumping the systems with a flashlamp for example they can be pulsed repeatedly, however, both the rate and number of cycles through which they can be pulsed are limited.

A linear flashlamp pumped dye laser fired at up to thirty pulses per second to produce an output pulse having five to ten milliwatts of power has also been reported in the literature. This system operates over a range of repetition rates that is useful; however the average power output, the energy contained in each output pulse, and the number of cycles over which the system will repeat before the performance becomes unacceptably deteriorated are insufficient for many present applications. A laser using a transverse flow dye cell with a flashlamp capable of being fired at up to fifty pulses per second has also been reported in the literature. Although, output power from the system has not been published, the transverse flow cell is known to be limited by the operating characteristics of its flashlamp. The largest reported power produced with a dye laser is one watt produced in a system using an argon ion laser to pump the dye laser. This system has the disadvantage of requiring an auxiliary laser to pump the active dye medium. At the present time, a flashlamp pumped laser which can produce a pulsed output with high energy and high average power at a fast repetition rate during an indefinite number of cycles without performance degradation is unavailable.

SUMMARY OF THE INVENTION

An object of the present invention is to produce high power pulses of laser energy at a high rate of repetition and to extend the useful life of such systems to more than a million cycles.

A further object of the present invention is to produce intense, short duration pulses of light energy with a high pressure arc.

According to the present invention a laser system having an optical pumping cavity that contains both an optical resonator with a gain medium and an electric lamp is operated with the lamp providing an arc discharge which is positionally stabilized by a pressure and temperature differential maintained across a vortex formed with a swirling gas flow; residual ionized particles can also stabilize the arc at high discharge rates. In a preferred embodiment of the present invention a dye laser is pumped by an intense, short duration arc discharge in an optical cavity formed by the inside surface of a figure of revolution such as a sphere. In alternate embodiments, other gain media are pumped in various geometrically defined optical cavities in which an intense short duration arc is discharged.

A primary advantage of the present invention is that the lamp arc can be sufficiently long to optimize lamp efficiency and overall output. Also, pulses of coherent laser energy can be produced with higher energy and at higher repetition rates than previously. In addition, the lifetime of the laser flashlamp has been significantly extended and more than a million firings can be initiated without serious degradation of performance of the lamp.

One feature of the present invention is the stabilizing effect produced on the arc by the residual ionization during operation at very high pulse rates. Another feature is the high gas pressure short arc flashlamp construction. The low inductance lamp produces a coaxial discharge arc approximately one to ten centimeters long that is stabilized by a pressure and temperature differential provided by the gas vortex. The lamp is comprised of a pair of gas cooled electrodes in a transparent envelope such as quartz and has a characteristic fast rise time when used in a low inductance discharge circuit such as a coaxial condenser. The lamp is operable at a fast repetition rate and with a long life expectancy due to the fast flow rate which sweeps away contaminants produced during operation. Further, the lamp is efficient and easily cooled during high power operation. Other features of the present invention include the pumping cavity which is often a figure of revolution. Locating the arc discharge and the laser gain medium on the axis of rotation of the figure of revolution provides an axially symmetric electrical environment for the flashlamp. Further, this radially symmetric pumping distribution in the gain medium minimizes thermal distortion effects.

The foregoing and other objects, features and advantages of the present invention will become more apparent in the light of the following detailed description of preferred embodiments thereof as illustrated in the accompanying drawing.

BRIEF DESCRIPTION OF THE DRAWING

FIG. 1 is a simplified cross sectional view of the present invention using an exfocal spherical pumping cavity;

FIG. 2 is a view along line 2—2 of FIG. 1;

FIG. 3 is a view along line 3—3 of FIG. 1;

FIG. 4 is a detailed schematic cross sectional view of the vortex stabilized arc lamp and the coaxial capacitor construction;

FIG. 5 is a schematic cross sectional view of the trigger electrode of the arc lamp; and FIG. 6 is a view along line 6—6 of FIG. 4.

DESCRIPTION OF PREFERRED EMBODIMENTS

Referring to FIG. 1, a dye laser system 10 is comprised of a shell 12 which is a spherical figure of revolution having a symmetric axis of revolution 13, an optical resonator 14 and an electric discharge arc lamp 16. The resonator has a transparent cylinder 18 capped on one end by a partially transmitting mirror 20 and on the opposite end by a fully reflecting mirror 22. Four approximately evenly spaced hollow struts 24 penetrate the shell 12 and are fixedly attached to a ring assembly 26 which engages the transparent cylinder. A headplate 28 having internal passages 30 rigidly attaches the resonator to the shell. The cylinder wall has suitably located holes therethrough so that fluid can flow into and out of the cylinder through the struts and the passages 30 respectively. The arc lamp 16 which is shown in greater detail in FIG. 4 has an upper main electrode 32 and a lower main electrode 34 which are concentrically mounted about a center axis 35 of a cylindrical transparent envelope 36; the axis of cylinder and the axis of rotation of the sphere coincide. The lower electrode is structurally supported by an electrode mounting 38 which also forms an inlet plenum 40 having an inlet connector 42. The cylindrical envelope 36 encloses an arc region 44 formed between the electrodes 32, 34; the arc region communicates with the inlet plenum through a plurality of skewed passages 46. Adjacent to the inlet plenum 40 is a coaxial capacitor 48 having upper plates 50 and lower plates 52. The upper and lower plates are connected across a power supply 54 through a charging resistor 56 and are electrically insulated from one another by a cylindrical nonconducting member 58. An outlet plenum 60 having an outlet connector 62 communicates with the arc region 44 through tubular passages 64 which are formed internal of tubes 66. The upper main electrode 32 which is shown in greater detail in FIG. 5 is comprised of a bullet shaped member 68 concentrically located about a trigger electrode 70. A spacer 71 of conducting material and a plug 72 of insulating material seal the top of the upper electrode and the spacer is penetrated by the tubes 66 as shown. The plug supports an electrically conducting wire 74 and a hole 76 penetrates the upper electrode adjacent to the trigger electrode.

The operation of this system requires suitable control of three interrelated systems, namely, the electrical, the gaseous and the optical gain medium systems.

The electrical system consists of a primary circuit and an auxiliary circuit which produces a discharge as will be explained more fully. To initiate an arc in the lamp, the capacitor is charged to a voltage which is below the gas breakdown voltage for the lamp. In the primary circuit the upper plates 50 and the lower plates 52 assume a differential charge from the power supply which is connected in series with the charging resistor across the capacitor plates. An electric potential is established between the upper and lower main electrodes which are connected to the upper and lower capacitor plates through the electrically conducting tubes 66 and the mounting 38 respectively. Then a potential is established between the trigger electrode and the upper electrode causing a local discharge in the vicinity of the hole 76. The auxiliary circuit provides suitable electric pulses from a trigger power source 77, and the pulses are transferred to the trigger electrode by the conducting wire 74. The potential maintained across the arc region by the capacitor is sufficient to cause an electric discharge between the main electrodes only under the condition when charged particles from the local discharge are present. Therefore, a main or arc discharge occurs immediately after charged particles from the local discharge enter the arc region. In a representative system which was operationally limited only by the power supply that was available, the auxiliary circuit provided a 25 kilovolt potential to the trigger electrode and provided one tenth of a joule of energy in pulses that were fifty nanoseconds in duration. The primary circuit included a power supply having a 15 kilovolt charge voltage. The coaxial capacitor had a capacitance of two microfareds and produced a discharge energy of 225 joules between the main electrodes. Up to 20 pulses per second could be produced with a 200 joule discharge and the average input power to the lamp was approximately 4 kilowatts.

In the gaseous system the inlet plenum is pressurized to about two atmospheres with a suitable gas such as argon through the inlet connector 42. The gas is flowed through the skewed passages 46 in the lower electrode mounting 38 at a rate of about 10 liters per second measured at standard conditions of temperature and pressure. The gas assumes a radial swirling motion about the axis 35 and has an azimuthal gas velocity component at the envelope 36 of about 6,000 centimeters per second. The swirling gas impinges on the envelope wall and forms a vortex about the axis of the envelope, the induced swirling results in a gas pressure of approximately two atmospheres at the wall which is graduated to a pressure of approximately one atmosphere along the axis of the vortex. Since an electric arc will tend to discharge more easily when the pressure in a given gas is lowered, an arc is readily struck between the main electrodes along the axis of the vortex. This is in contradistinction to the temperature stabilized continuous wave vortex arc lamps which cannot be used for pulse operation. Temperature stabilized lamps which have been widely discussed in the literature and have been the subject of several patents do not achieve a sufficient pressure differential to stabilize the arc position on a pulsed basis. In fact, the continuous wave devices must be started by drawing the arc, that is, initiating the arc over a very short distance and then increasing the length of the arc during operation, or by injecting a gas such as argon or helium between the electrodes prior to initiation of the discharge. The present invention achieves the relatively high pressure differential by the use of a high tangential gas swirl velocity. At very high repetition rates, when the gas in the lamp is not exchanged completely in the time between successive discharges, a temperature gradient will also be produced, and, as in the case of the direct current lamps this will assist in stabilizing the discharge. The effects of flow swirl and pressure differential cause the vortex to stabilize near the hole 76, and the gas leaving the arc region 44 flows through the hole, around the trigger electrode 70 through the tubular passages 64 into the outlet plenum 60, and through the outlet connector 62. Accurate positional stabilization of the arc along the axis of rotation of the pumping cavity is essential to good focusing of radiation from the arc in the gain medium.

In the optical gain medium circuit a dye solution comprised of a dye such as rhodamine B, rhodamine 6G, sodium fluorescein, brilliant sulfoflavine, 1, 3-diphenylisobenzofuran, 7-diethylamino-4-methyl coumarin and a solvent of either ethanol or water is passed through the hollow struts 24 to the ring assembly 26 at a flow rate of about one and a half gallons per minute. The dye flows through the cylinder 18 and out of the partially transmitting mirror end of the resonator through the internal passages 30 in the headplate. Gaseous or solid state material can also be used as the gain medium with no unusual special changes to the system.

When the electrical gaseous and gain medium systems are operated in an integrated fashion, electromagnetic radiation produced by the arc discharge covers essentially the entire inner surface of the spherical shell 12. The arc, the vortex, and the gain medium in the resonator are each centered about the axis of the sphere. Although the pumping cavity shown in the drawing is a sphere, other geometric shapes may be utilized with this invention. The electromagnetic radiation from the arc is coupled to the gain medium in the resonator as reflected rays 78 which are shown representatively in FIGS. 1 and 3; the transfer of optical energy from the arc to the gain medium is effectively one hundred percent efficient. A population inversion is produced in the energy level structure of the gain medium due to the pumping effect of the radiation from the lamp; the inversion in turn provides an output 80 of pulsed laser energy due to stimulated emission in the resonator and with a rhodamine 6G dye an overall output efficiency of three tenths of one percent can be achieved.

At all but the highest repetition rates, an axially symmetric electrical environment is critical for suitable vortex stabilization of the flashlamp. When the lamp and the resonator are located on the axis of rotation in an exfocal pumping cavity design for example, the arc is readily stabilized and radiation from the arc is efficiently coupled into the resonator. At high repetition rates in the range of 200 pulses per second for the system described, both the temperature and the pressure gradients contribute toward stabilizing the arc and asymmetric pumping cavities such as the cylindrical elliptical cavity are suitable. The temperature gradient provides additional stability and permits the lamp to operate reliably with an asymmetric electric environment. However, for ease in initiating the pulsating discharge, an electrically symmetric electrical environment is preferable.

The gases used to sustain the electrical discharge can be any of the rare gases. The preferred gas from a performance point of view is xenon, however, as a practical matter xenon is prohibitively expensive unless a closed cycle gas system is used. The next in the order of desirability is krypton which again is not used because of economic reasons. Argon gas has been found to be a good compromise gas in terms of economics and performance. In a very fast rise time system in which optimum overall performance is not required, hydrogen is suitable as the gaseous discharge medium.

The relatively long lifetime of the arc lamp and in turn the entire laser system of the present invention is attributed to the high velocity of the gas flow through the lamp. Comparable lamps which have a sealed gas system have a half life of approximately 10,000 cycles at twenty joules per pulse whereas the lamp construction in accordance with the present invention provides in excess of 1,000,000 repeatable cycles at 20 joules per pulse for the same construction materials when the gas is flowed at a rate of 1 liter per second measured at standard conditions of temperature and pressure. It is suggested that the long life of the lamp is due to the removal of material eroded by the discharge from the electrodes by the high velocity gas flow. This hypothesis is supported by the absence of any substantial deposition of electrode material on the lamp envelope which is contrary to prior experience with the nonflow lamps. Vortex stabilized lamps having an energy conversion efficiency in the range of 15 to 20 percent have been operated with argon gas producing a flash rise time of six tenths of a microsecond and a flash duration of one and seven tenths microseconds. With a discharge energy of 200 joules per pulse more than 100,000 cycles have been observed before the lamp output was reduced to one half of its initial output; it is significant to note that the output deterioration was due to the formation of color centers in the commercial grade quartz envelope and not the plating out on the lamp enclosure of material sputtered off by the electrodes. When the pulse energy was reduced to 20 joules, the half life of the lamp was increased to an excess of 1,000,000 cycles. In no experiments were any deposits noticeable on the lamp envelope and it was only the formation of color centers in the quartz that compromise the lamp output characteristics.

An arc lamp according to the present invention can be designed with an arc length sufficiently long to allow optimization of both the lamp efficiency and overall optical output. Nonflowing variations of this type of arc lamp have been commercially available for some time, however, their arc length is limited due to arc stability problems in which the arc jitters between the discharge electrodes and strikes the wall of the lamp causing the wall to explode. Sealed arc lamps have been limited to arc lengths of less than one centimeter and this in turn has prevented optimization of the lamp efficiency. More specifically, when an arc is discharged across a distance of less than 1 centimeter, it is difficult to match the impedance of the arc to the impedance of the driver circuit correctly. Further, when the energy discharged is increased, the lamp output energy does not increase correspondingly for reasons which are not entirely understood. Thus, the use of a fast vortex flow with a high pressure differential allows stabilization of the discharge arc at electrode separation lengths of more than 6 centimeters and consequently the problems of impedance matching and saturation of the lamp output are avoided.

The high repetition rate available with the vortex stabilized arc lamp of the present invention is due primarily to the elimination of the ionized gaseous species left in the arc region after the lamp has fired. The fas flow through the arc region is sufficiently fast to remove both the eroded electrode material and the ionized gaseous residue from the previous firing before a subsequent discharge is initiated. Consequently, when the lamp is recycled even at a fast rate, the condition of the discharge medium between pulses is as clean and uncontaminated as prior to the initial firing. At a flow rate of 10 liters per second, the gas in the lamps is interchanged more than 100 times each second. This guarantees complete removal of the undesired species from the arc region and also cools the interior of the lamp very efficiently, thereby permitting operation at the indicated high power levels concomitantly with the indicated fast repetition rate. If the lamp is pulsed faster than the gas removal rate the static firing voltage decreases due to the incomplete removal of ionized gaseous species. However, the lamp still operates and the stability is improved due to the temperature gradient and the preferential location of the remaining ionized species along the axis of the lamp. If the pulse rate is increased beyond this operating condition, the firing voltage decreases further and the lamp ceases to pulse, and operates continuous wave. In some instances the latter problem can be overcome by the use of a series switch, such as a thyratron.

Although this invention has been shown and described with respect to preferred embodiments thereof, it should be understood by those skilled in the art that various changes and omissions in the form and detail thereof may be made without departing from the spirit and the scope of the invention.

Having thus described a typical embodiment of our invention, that which we claim as new and desire to secure by Letters Patent of the United States is:

1. A pulse laser system comprising:
 an optical pumping cavity formed of a surface of revolution and having an axis of symmetry;
 an optical resonator positioned inside the cavity along the axis and including:
  a pair of mirrors, one of which is fully reflecting and the other of which is partially transmitting; and
  a gain medium;
 an arc lamp which extends into the optical cavity and has a central axis which is coincident with the cavity axis to produce electromagnetic energy for pumping the gain medium in the resonator, the lamp comprising;
  a first primary electrode which is on the central axis and includes,
   an enclosure of electrically conductive material which is penetrated by a gas inlet hole encircling the central axis,
   a trigger electrode supported along the central aixs, internal to the enclosure, and electrically insulated from the enclosure,
   a spacer element of electrically conductive material which forms an extension to the enclosure and is penetrated by a plurality of gas outlet passages, and
   a trigger electrode energy source for establishing an electrical potential between the trigger electrode and the enclosure;
  a second primary electrode which is spaced apart from the first electrode by more than two centimeters along the central axis;
  a mounting formed into a gas inlet plenum which is fixedly attached to the second electrode;
  an envelope extending between the first and second electrodes, the envelope being transparent to radiation from the lamp and symmetrically disposed about the central axis to contain a gas flow between the electrodes;
  means for introducing gas from the plenum through the mounting and into the envelope at several positions adjacent to the second primary electrode, and
  means electrically connected to the first and second electrodes for establishing a voltage difference between the first and second electrodes.

2. A pulsed dye laser comprising:
 an optical pumping cavity formed of a surface of revolution and having an axis of symmetry;
 a linear optical resonator positioned inside the cavity along the axis and including:
  a pair of mirrors, one of which is fully reflecting the other of which is partially transmitting;
  a transparent cell to contain laser dye in the resonator;
  means for flowing the dye into and out of the cell; and
 an arc lamp which extends into the cavity and has a central axis which is coincident with the cavity axis to produce electromagnetic energy for pumping the dye in the resonator, the lamp comprising;
  an anode which is positioned on the central axis;
  a cathode which is spaced apart from the anode by more than two centimeters and positioned on the central axis, and includes,
   an enclosure of electrically conductive material which is penetrated by a gas inlet hole encircling the central axis,
   a trigger electrode supported along the central axis, internal to the enclosure, and electrically insulated from the enclosure,
   a spacer element of electrically conductive material which forms an extension to the enclosure and is penetrated by a plurality of gas outlet passages, and
   a trigger electrode energy source for establishing an electrical potential between the trigger electrode and the enclosure;
  a mounting formed into a gas inlet plenum which is fixedly attached to the second electrode;
  an envelope extending between the anode and cathode, the envelope being transparent to radiation from the lamp and symmetrically disposed about the central axis to conduct a gas flow between the electrodes;
  means for tangentially introducing gas from the plenum through the mounting and into the envelope at several positions adjacent to the cathode, the gas being introduced obliquely to the axis of symmetry to cause swirling of the gas and induce a vortex about the central axis between the anode and cathode; and
  means for removing gas from the envelope along the axis of symmetry through the hole in the cathode.

3. The pulsed laser according to claim 2 wherein the means for flowing dye into the cell includes a small diameter thin wall tube which is attached to and provides structural support for the end of the resonator having the fully reflecting mirror.

4. The pulsed laser according to claim 2 wherein the pumping cavity is a sphere.

5. In a pulsed laser system the combination comprising:
 a gain medium;
 an optical pumping cavity for transferring optical radiation to the gain medium;
 an optical resonator positioned inside the cavity and containing the gain medium;
 an arc lamp which is positioned inside the cavity and produces pulsed optical radiation for pumping the gain medium, the lamp comprising:
  a first and a second primary electrode which are spaced apart from each other along an electrode axis by more than two centimeters the first electrode including,
   an enclosure of electrically conductive material which is penetrated by a gas inlet hole encircling the electrode axis,
   a trigger electrode supported along the electrode axis, internal to the enclosure, and electrically insulated from the enclosure, a spacer element of electrically conductive material which forms an extension to the enclosure and is penetrated by a plurality of gas outlet passages, and a trigger electrode energy source for establishing an electrical potential between the trigger electrode and the enclosure;

an envelope which extends between the first and second electrodes and is transparent to the radiation produced by the lamp;

means for introducing gas into the envelope at several positions adjacent to the second electrode, the gas being introduced at an angle to the axis to cause swirling of the gas and induce a stabilizing vortex about the axis; and means for removing the gas from the envelope; and means for providing electrical power to the arc lamp.

6. In a pulsed dye laser system the combination comprising;

an arc lamp having two primary electrodes which are aligned along a lamp axis and more than two centimeters separated, one of said primary electrodes including;

an enclosure of electrically conductive material which is penetrated by a gas inlet hole encircling the lamp axis, a trigger electrode supported along the lamp axis, internal to the enclosure, and electrically insulated from the enclosure, a spacer element of electrically conductive material which forms an extension to the enclosure and is penetrated by a plurality of gas outlet passages, and a trigger electrode energy source for establishing an electrical potential between the trigger electrode and the enclosure;

a gain medium of dye material;

an optical pumping cavity which encloses both the gain medium and the arc lamp, the pumping cavity providing for the transfer of optical radiation from the lamp to the gain medium;

means for providing a vortex gas flow around the lamp axis;

means for supplying pulsed electrical power to the arc lamp electrodes;

a transparent cell to contain the dye within the cavity; and means for flowing the dye into and out of the cell.

7. The invention according to claim 6 wherein the optical pumping cavity comprises a cylindrical ellipse and the arc lamp is located along one focus line of the cavity and the gain medium is located along the other focus line of the cavity.

* * * * *